3,523,094
FOUNDRY CORES COMPRISING CEREAL BINDER AND A CRITICAL AMOUNT OF WATER
Hugh J. Roberts, Milwaukee, and Ernest L. Wimmer, Elm Grove, Wis., and Roderick J. Cowles, Needham, Mass., assignors to Krause Milling Company, Milwaukee, Wis., a corporation of Wisconsin
Filed Feb. 19, 1969, Ser. No. 800,446
Int. Cl. C08g 37/14
U.S. Cl. 260—17.2                                         6 Claims

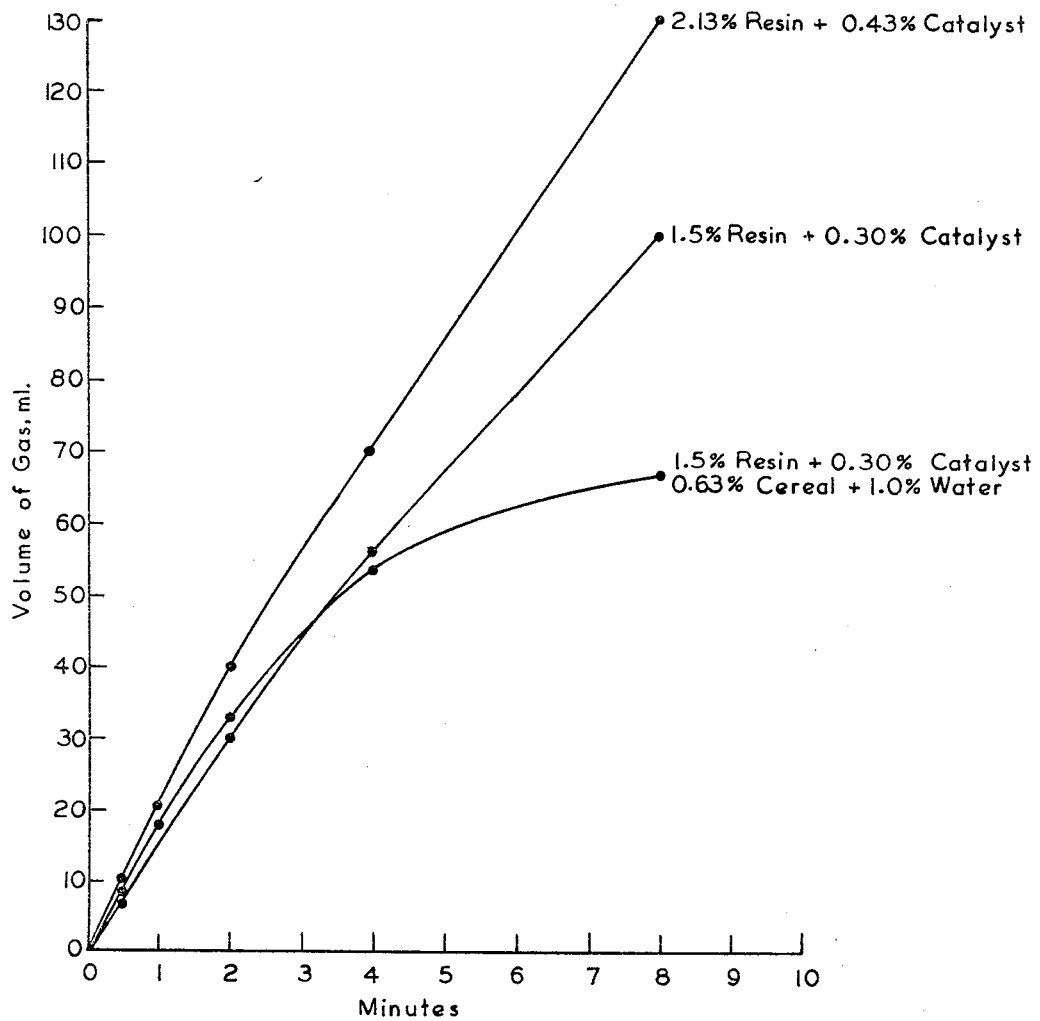

ABSTRACT OF THE DISCLOSURE

In the hot box process for producing foundry cores, a cereal binder and a critical amount of water are incorporated into the sand-resin-catalyst mix to obtain improvement in collapsibility and shake-out and a reduction in gas and odor formation.

BACKGROUND OF THE INVENTION

Field of the invention

The present invention relates to the production of foundry cores by a method commonly known as the hot box process.

Description of the prior art

A foundry core is a shaped article composed of a major portion of sand and a minor portion of a binder. The core may be either green or dry. Green sand cores are used in a "green" or moist condition in which the binder provides the core with sufficient "green" or wet strength to maintain its shape without support. Dry sand cores have been subjected to some treatment that hardens them. The function of the core is to aid in the formation of an internal cavity in a metal casting, or to aid in the removal of some portion of the external surface of the casting which would not otherwise be possible.

Methods for producing foundry cores as now known are of several types, each with its own advantages and applications. The traditional and still widely practiced method involves baking. Binders for baked cores are organic compounds that dry or cure relatively slowly on heating. Typical of this group of binders are the drying and semidrying oils. The art of core baking has been advanced by the development of synthetic resins having a somewhat more rapid rate of cure, such as those described in U.S. Pats. 2,861,980 and 2,953,535. Most baking binders do not impart sufficient green strength to permit the core to retain its shape until it is placed in the baking oven. Consequently, baking binders are usually augmented by additions of clay or a cereal binder together with sufficient water to develop the desired green strength.

A second method for producing foundry cores is the cold-setting or no bake process. This method permits production of large cores (up to several tons in weight) as single units instead of assemblies of many smaller oven baked cores. Cold setting binders include inorganic materials such as sodium silicate and Portland cement, and organic resins such as those described in U.S. Pats. 3,205,191 and 3,184,814. To define the no bake process as one that requires no oven drying or curing is inaccurate, since many of the no bake binders develop sufficient strength at room temperature to allow the core to be removed from the core box, but still require a short oven bake before use in casting.

A third method for making foundry cores is the shell process, which produces a hollow sand core. A flowable mixture of sand and thermosetting resin is brought into contact with a heated pattern, resulting in fusion of the resin in close proximity to the pattern. A thin shell of bonded sand is thus formed around the excess uncured sand-binder mixture, which is subsequently removed for re-use. This process was developed by Croning in Germany during World War II. Improvements in shell molding compositions have been described in U.S. Pats. 2,923,989, 2,943,068, 3,008,205, 3,020,609 and others. The shell core process gives faster production rates than does the use of baking or no bake binders, although shell cores may require a few minutes oven-curing before casting.

The method of producing foundry cores to which this invention relates is the hot box process as described in U.S. Pats. 3,168,489, 3,168.490, and 3,216,075, and also in H. W. Dietert, "Foundry Sand Practice," 3rd ed., American Foundrymen's Society, Des Plaines, Ill., 1966, p. 257ff. The hot box process finds its greatest application in the high speed production of small and medium sized cores (up to 25 lbs.) in such industries as automotive and farm equipment. As in the shell core process, a heated core box is used. The binder, however, is a resin that cures throughout the core by virtue of a very rapid, exothermic reaction. Dwell times in the core box are measured in seconds. Curing usually continues for 10-20 minutes after the core is removed from the box, but no additional external heating is necessary. Because cores can be produced in a fraction of the time required by other methods, the hot box process has attained a high degree of commercial acceptance in a relatively short period of time. This rapid and widespread acceptance, however, has revealed certain problems associated with the hot box process. The exothermic curing resin binders give off objectionable fumes that build up in the work area; a release agent is often required to prevent the core from sticking to the core box; shakeout of the core sand from the finished casting is sometimes difficult in spite of the high degree of collapsibility associated with hot box resins; excessive gas formation during casting gives rise to pinholes; and defects in the surface of the cast metal sometimes occur as the result of a lack of resistance of the core surface to erosion by the molten metal.

The resin binders originally used in the hot box process were of the furfuryl alcohol type. More recently urea-formaldehyde has been substituted for part of the furfuryl alcohol to produce urea-modified furan resins, and phenol for part or all of the furfuryl alcohol to give phenolic (phenol-urea-formaldehyde) or phenol-modified furan (phenol-urea-formaldehyde-furfuryl alcohol) resins. All of these hot box resin formulations are liquids that undergo a rapid exothermic cure when activated by heat and an acidic catalyst. Common catalysts are aqueous solutions of ammonium chloride or phosphoric acid.

Cereal binders are well known in the foundry industries and are used to some extent in most foundries. They are manufactured by one of two processes: by subjecting crude starches or flours to a combination of heat and pressure in the presence of sufficient moisture to cause gelatinization of at least a portion of the starch, or by thermal degradation (dextrinization) of starches or flours. The principal use of cereal binders in the foundry is in conjunction with core oil or with baking resins to provide green strength in baked cores.

In the present invention a small amount of cereal binder together with a critical amount of water is incorporated into known hot box core compositions comprising sand, an exothermic curing resin and a catalyst.

It is clear from the nature of the hot box process that green strength is unnecessary in the core sand mix since the shaping and setting of the core takes place simultaneously in a period of seconds. In fact, one would expect green strength to be detrimental, since increased cohesion of the green sand mix should reduce the ability of the mixture to flow freely into the mold. Furthermore, the addition of cereal and water to provide green strength in other resin binder systems is known to result in a prolonged curing time, a loss of humidity resistance, and a reduction in cured tensile strength (Brown and Watson, U.S. Pat. 3,168,489). Thus it is a surprising discovery that the incorporation of a cereal binder together with a critical amount of water affords significant improvements in the art of foundry core-making using hot box resins, without reducing the flowability of the sand-resin mixture.

The object of this invention is to improve the hot box process for producing cores by overcoming the problems inherent in the existing process. Specific objects of the invention are a reduction in the level of irritating odors, an increase in the hardness of the core surface, elimination of sticking in the core box, a reduction of gas production during casting, an improvement in shakeout after casting, and a reduction in the overall cost of the binder system.

The figure of the drawing shows gas rate and volume curves to illustrate the advantageous effects of the invention upon volume of gas produced by a hot box core during casting.

DESCRIPTION OF THE PREFERRED EMBODIMENT

The amount of cereal binder that is incorporated into the sand-resin-catalyst mix according to this invention is conveniently expressed in terms of the weight of sand. A typical prior art sand mix for hot box application contains 2% resin and 0.4% catalyst (activator) based on sand. The resin may vary from 1–3% but the resin:catalyst ratio normally remains at about 5:1.

The resin that is preferred with the present invention is a furfuryl alcohol based resin hereinafter referred to as a furan resin. This furan resin may or may not contain urea formaldehyde which is sometimes added to reduce the cost. Where this is done the resin may comprise a mixture of 5–50 parts by weight of furfuryl alcohol and about 90–35 parts by weight of a stable non-polymerized mixture of urea formaldehyde and equilibrium products thereof. This is termed a urea modified furan resin. It is also possible with the present invention to substitute phenol for all or part of the furfuryl alcohol to give phenolic (phenol urea formaldehyde furfuryl alcohol) resins. All of these hot box resin formulations are liquids that undergo a rapid exothermic cure when activated by heat and an acidic catalyst.

The preferred hot box core composition comprises a major portion of sand, with percentages of the other ingredients expressed in terms of the weight of sand, as follows:

1.5%—furan resin
0.63%—cereal binder
0.3%—acid catalyst (approximately one-fifth of the amount of resin where added as a solution with 20% catalyst in water)
1.0%—added water.

The ingredients which are used with the sand may be in the following ranges:

1.0–2.5%—furan resin
0.1–1.5%—cereal binder
2–20% of the amount of resin—active portion of the acid catalyst
0.2%–2.5%—water, including the water present in the resin and catalyst.

The catalyst is an acidic catalyst and is preferably 20% ammonium chloride in water. However, any acidic catalyst may be employed, e.g., ammonium chloride, phosphoric acid, ammonium trichloroacetate, ammonium dihydrogen phosphate, ammonium sulfate and ammonium nitrate. Ammonium salts of a strong acid are particularly well adapted to use as a catalyst in this invention. Where the acid catalyst is added as a water solution, with 20% catalyst in water, then the acid catalyst solution will be 10–30% of the amount of the resin. Where the acid catalyst is not added as a water solution, the amount of acid catalyst may be varied by using a smaller amount of catalyst which is closer to 100% active.

The invention is explained in greater detail in the following examples, which are for illustrative purposes only and are not to be considered limiting in any respect.

EXAMPLE I

This example illustrates the application of the invention to reduce the level of usage of hot box resin and catalyst, thereby reducing the level of irritating odor associated with the resin, and effecting a savings in cost of manufacture of the core.

Two sand mixes, A and B, were prepared as follows:

| Ingredient | Mix A, lb. | Mix B, lb. |
|---|---|---|
| Sand, Michigan City-Lake Blend | 100 | 100 |
| Resin, urea modified furfuryl alcohol | 2.0 | 1.7 |
| Catalyst, 20% ammonium chloride in water | 0.40 | 0.34 |
| Cereal, gelatinized corn flour | 0 | 0.30 |
| Additional water | 0 | 0.30 |

The ingredients were combined in a Simpson Porto-Muller in the following manner. Mix A: sand plus catalyst mulled 30 sec., resin added and mulled 210 sec.; Mix B: sand plus water mulled 30 sec., cereal added, mulled 60 sec., catalyst added, mulled 30 sec., resin added and mulled 150 sec.

From each mix six test briquets were formed on a Redford core blower at 100 p.s.i., with curing cycles of 40, 50 and 60 sec. at 450–475° F. Flowabilities of the mixes were similar. Tensile strengths of the briquets were measured about 3 hours after blowing. The average values of six briquets indicated no loss of tensile strength in Mix B due to the incorporation of the cereal and additional water:

| Cure time, sec | 40 | 50 | 60 |
|---|---|---|---|
| Mix A, tensile, av. of 6, p.s.i | 385 | 372 | 336 |
| Mix B, tensile, av. of 6, p.s.i | 368 | 378 | 853 |

EXAMPLE II

This example illustrates some of the advantages of the invention when practiced in a commercial foundry using the hot box process to produce small cores for casting electrical conduit fittings. Prior to this invention the cores were produced from the following conventional mix: sand, 400 lb.; urea-modified furan resin, 8.8 lb.; 30% ammonium chloride solution catalyst, 0.88 lb.; fly ash, 3 lb.; and corn cob flour, 2.5 lb. The fly ash was found to be necessary to give satisfactory core surface smoothness, and the cob flour to overcome poor shakeout. Even with the additives in this conventional mix, the foundry experienced off-and-on castings defects due to core surface failures.

A trial commercial batch of cores was produced from a mix prepared according to this invention: sand, 400 lb.; urea-modified furan resin, 7.0 lb.; 30% ammonium chloride catalyst, 0.88 lb.; gelatinized corn flour, 1.75 lb.; and water, 3 lb. The mulling cycle normally used (sand, resin and catalyst mulled 2 min., fly ash plus cob flour added and mulled 1 min.) was changed slightly to accommodate to the added water: sand, resin and catalyst mulled 2 min., cereal added and mulled 1 min., water added and mulled 2 min. Three different cores were blown for use in three different castings, using the normal hot box dwell times of 2.5, 9, and 18 sec. depending upon the complexity of the core design. All of the cores were produced without difficulty, and no sticking in the core-box occurred. Castings were poured using the cores; shake-out was easy, and the castings were of excellent quality with no surface defects. A significant saving in cost of materials was afforded by the replacement of 3 lb. fly ash, 2.5 lb. cob flour, and 1.8 lb. resin by 1.75 lb. cereal binder and 3 lb. water.

EXAMPLE III

This example illustrates the improvement in core surface hardness afforded by the invention, as well as the importance of the addition of water. Test briquets were formed in a Redford laboratory core blower from mixes made up in a 10 qt. Hobart mixer as follows: 6600 g. sand (Wedron, AFS–50) plus water (if added), mixed 30 sec.; 19.8 g. catalyst (20% ammonium chloride solution) added, mixed 45 sec.; and 66 g. resin (urea modified furan) added and mixed 90 sec. Dwell time was 15 sec. at 450° F. Scratch hardness, a measure of resistance of core surface to erosion by molten metal, was measured 15 minutes after ejection of the test briquets from the hot box. The data in Table 1 show that surface hardness is improved by the addition of a cereal binder with an optimum amount of water.

TABLE 1.—SCRATCH HARDNESS OF TEST BRIQUETS OF EXAMPLE III

| Test No. | Water added ml. | Total water in mix, percent | Scratch hardness [1] duplicates |
|---|---|---|---|
| 8 Control [2] | 0 | 0.24 | 83, 83 |
| 7 | 0 | 0.24 | 75, 82 |
| 9 | 41 | 0.87 | 85, 87 |
| 10 | 62 | 1.18 | 88, 89 |
| 15 | 83 | 1.79 | 85, 86 |

[1] Scratch hardness was measured in thousandths of an inch; 100 indicates complete resistance to scratching and 0 indicates a scratch 100/1,000u in depth.
[2] In test No. 8 only resin and catalyst were used; no cereal binder was added.

EXAMPLE IV

This example illustrates the importance of water when the invention is practiced with a phenolic hot box resin. Example III was repeated using the same amount of a phenolic resin at two levels of water addition. Both tensile strength and scratch hardness were measured at 15 minutes and 2 hours after ejection from the hot box. The results in Table 2 show that both tensile strength and scratch hardness are increased by the addition of an optimum amount of water.

TABLE 2.—TEST DATA FROM EXAMPLE IV

| Test No. | Water added, ml. | Total water in mix, percent | Tensile strength, lb. 15 min. | 2 hr. | Scratch hardness 15 min. | 2 hr |
|---|---|---|---|---|---|---|
| 17 | 8 | 0.43 | 78, 110 | 143, 160 | 30, 40 | 60, 60 |
| 18 | 66 | 1.24 | 180, 225 | 210, 235 | 80, 84 | 83, 86 |

EXAMPLE V

This example illustrates the improvement in collapsibility (shake-out) afforded by the invention. Test cylinders were prepared by ramming the sand-binder mix and curing in a 400° F. oven for ten minutes. The mix was prepared in a Hobart mixer, using the mixing cycle described in Example III, from the following ingredients: Michigan City-Lake sand blend, 6600 g.; urea-modified furan resin, 140 or 99 g.; catalyst (20% ammonium chloride solution), 20% of the weight of the resin; gelatinized corn flour, 0 or 41 g.; water, 0 or 82 ml. The test cylinders were fired for 10 min. in a furnace at either 800° F. or 1200° F., removed and cooled, and the retained compressive strength was measured. None of the test cylinders retained any measurable strength after 10 min. at 1200° F., precluding a quantitative measure of shake-out. However, the cylinders heated at 800° F. for 10 min. retained sufficient strength to show a marked improvement in collapsibility rating for the cylinders prepared according to this invention (Table 3). A subjective collapsibility rating based on visual observation of the 1200° F. cylinders ranked at three formulations in the same order as that found by measurement of the 800° F. cylinders.

TABLE 3.—COLLAPSIBILITY OF TEST CYLINDERS OF EXAMPLE V

| Test No. | Resin, g. | Catalyst, g. | Cereal, g. | Water added, g. | Compressive strength,[1] p.s.i. |
|---|---|---|---|---|---|
| 23 | 140 | 28 | 0 | 0 | 724 |
| 24 | 99 | 19.8 | 0 | 0 | 636 |
| 25 | 99 | 19.8 | 41 | 82 | 119 |

[1] Retained after 10 min. at 800° F.

EXAMPLE VI

This example illustrates the advantageous effects of the invention upon volume of gas produced by a hot box core during casting. Cylinders produced as in tests 23 and 24, Example V, that contained no cereal binder were tested for gas production by the method described on p. 154.5 of "Foundry Sand Practice" by H. W. Dietert, 3rd ed., American Foundrymen's Society, Des Plaines, Ill., 1966. In addition a cereal-containing cylinder produced similarly to that of test 25 (test 27, 1.5% resin, 0.3% catalyst, 0.63% cereal binder, but 10% additional water instead of 1.25%) was tested in a like manner. The gas rate and volume curves (see drawing) show a marked superiority for the cylinder produced by the method of this invention.

What we claim is:

1. In a hot box core composition consisting essentially of a major proportion of sand and about 1%–3% of the weight of the sand of a liquid resin together with about 10–30% by weight of an acid catalyst based on the weight of the resin, wherein the liquid resin is selected from the group consisting of a urea-modified furan resin, a phenol-urea-formaldehyde resin and a phenol-modified furan resin, the improvement which consists of the addition of 0.1%–1.5% of cereal binder with respect to the amount of sand and a critical amount of water which brings the amount of water in the composition to 0.2%–2.5% including the water present in the resin and catalyst.

2. A hot box core composition as claimed in claim 1 in which the amount of resin is 1.0–2.5% of the weight of the sand, and the amount of cereal binder 0.1–1.5% of the weight of the sand.

3. A hot box core composition as claimed in claim 2 in which the active portion of the acid catalyst is 2–20% of the amount of the resin.

4. A hot box core composition as claimed in claim 2 in which the acid catalyst is added as a solution in water with the acid catalyst being 20% of the solution, and in which the acid catalyst is 10–30% of the amount of the resin.

5. A hot box core composition as claimed in claim 1 in which the resin is about 1.5% of the weight of the sand, the cereal binder about 0.63% of the weight of the sand, and the acid catalyst about 0.3% of the weight of the sand.

6. A hot box core composition as claimed in claim 1 in which the cereal is gelatinized corn flour.

References Cited

UNITED STATES PATENTS 2,953,535    9/1960    Salzberg et al. _____ 260—19
3,024,215    3/1962    Freeman et al. _____ 260—17.2

FOREIGN PATENTS 742,296    9/1966    Canada.

WILLIAM H. SHORT, Primary Examiner

E. WOODBERRY, Assistant Examiner

U.S. Cl. X.R.

260—17.3, 17.4, 38, 39, 41